(12) United States Patent
McKeeth

(10) Patent No.: US 6,260,140 B1
(45) Date of Patent: Jul. 10, 2001

(54) OPERATING SYSTEM MULTI BOOT INTEGRATOR

(75) Inventor: James Aaron McKeeth, Nampa, ID (US)

(73) Assignee: Micron Electronics, Inc., Nampa, ID (US)

(*) Notice: Subject to any disclaimer, the term of this patent is extended or adjusted under 35 U.S.C. 154(b) by 0 days.

(21) Appl. No.: 09/201,911

(22) Filed: Nov. 30, 1998

(51) Int. Cl.$^7$ .................................................. G06F 9/44
(52) U.S. Cl. .................................... 713/100; 709/319
(58) Field of Search .................... 713/1, 2, 100; 709/319

(56) References Cited

U.S. PATENT DOCUMENTS

| | | | |
|---|---|---|---|
| 4,530,052 | * 7/1985 | King et al. ............... | 713/100 |
| 4,799,145 | 1/1989 | Goss et al. . | |
| 5,136,711 | 8/1992 | Hugard et al. . | |
| 5,361,358 | 11/1994 | Cox et al. . | |
| 5,367,661 | 11/1994 | Hough et al. . | |
| 5,408,617 | 4/1995 | Yoshida . | |
| 5,428,792 | 6/1995 | Conner et al. . | |
| 5,617,560 | 4/1997 | Ichikawa . | |
| 5,684,955 | * 11/1997 | Meyer et al. ............ | 709/316 |
| 5,689,701 | 11/1997 | Ault et al. . | |
| 5,812,842 | 9/1998 | Yamazaki et al. . | |
| 5,819,020 | * 10/1998 | Beeler, Jr. ............... | 714/5 |
| 5,845,282 | 12/1998 | Alley et al. . | |
| 5,887,163 | 3/1999 | Nguyen et al. . | |
| 6,032,239 | 2/2000 | Beelitz . | |
| 6,144,969 | 11/2000 | Inokuchi et al. . | |
| 9,201,097 | 11/1998 | McKeeth . | |

OTHER PUBLICATIONS http:/www.winehq/com/about.shtml; "Wine Development HQ–A free implementation of Windows for Unix"; Dec. 17, 2000.

"Bridging the Gap Between Mac and DOS"; Smart Computing–Editorial; Jun. 1993 vol. 4 Issue 6.

http://softseek.zdnet.com; Softseek.com—"Mini Notetab" by Fookes Software; Aug. 8, 1997.

http://softseek.zdnet.com; Softseek.com—"ToX" by Jay Honeywell; Apr. 2, 1998.

* cited by examiner

Primary Examiner—Thomas M. Heckler
(74) Attorney, Agent, or Firm—PerkinsCoie LLP

(57) ABSTRACT

A computer apparatus for monitoring and integrating changes made to a computer system having a plurality of operating systems installed thereon is provided. The apparatus monitors and records changes in accordance with user preferences for a first operating system. When the computer is booted for use with a second operating system, the apparatus integrates into the second operating system and associated programs the changes made during operation of the computer with the first operating system.

39 Claims, 4 Drawing Sheets

OPERATING SYSTEM MULTI BOOT INTEGRATOR

BACKGROUND OF THE INVENTION

1. Field of the Invention

The present invention relates to the field of computers and, more particularly to an operating system (OS) multi boot integrator.

2. Description of the Related Art

The use of computers, especially the personal computer (PC) has become widespread. The computing power of the PC, whether coupled to a network or operating as a stand-alone device, has increased significantly with the development of new computer architectures. Newer operating systems (OS) have been developed to take advantage of the ever increasing computing power.

A computer operating system is a collection of software programs which control the execution of application programs running on the computer. Typically, an operating system manages the interaction of the computer hardware and software running on the computer by providing services to the software applications such as resource allocation, scheduling of tasks, data management and input and output (I/O) control. The loading of an operating system into the computer's memory is known as "booting" the OS. The reloading of an operating system (typically performed after resetting the computer) is known as "rebooting" the OS.

A computer user is free to purchase and install an operating system that differs from the one installed on the computer when it was purchased. Today, there are numerous commercially available operating systems to choose from including, but not limited, to MS-DOS, UNIX, LINUX, OS/2, WINDOWS 3.x, WINDOWS NT, and WINDOWS 95.

Although these operating systems perform similar tasks, and many are capable of running the same application programs, each operating system has its own strengths. Sometimes a user wishing to capitalize on the strengths of these operating systems will install more than one OS on the same computer. Commercially available software utilities aid a user in installing additional operating systems on their computers. These utilities also allow a user to choose which operating system to boot while a computer is being powered-on or reset. The capability to boot different operating systems on the same computer is often referred to as an OS multi boot or multi booting.

Having more than one operating system on the same computer is not without its problems. One problem arises when a user installs an application program, such as, for example, a "browser" for the INTERNET, on a PC operating with a first operating system (OS #1). The user sets up communication and user settings for the browser, uses the browser and saves a few bookmarks for interesting sites found while browsing the INTERNET. The user subsequently boots his computer with a second operating system (OS #2), but cannot use the browser since it was installed for OS #1. The user would have to re-install the browser for OS #2 and then set up the communication and user settings for the newly installed browser. The bookmarks for the browser installed for OS #2 would have to be updated to include the bookmarks saved for OS #1.

If the user operates the browser installed for OS #2, and modifies any settings or bookmarks, then the user would have to boot the computer in OS #1 and manually update the browser's settings and bookmarks to keep the browsers settings consistent between OS #1 and OS #2. This takes time and can lead to mistakes particularly for applications which are far more complicated than a browser. More complicated applications, for example, may be too difficult for a user to integrate in an OS multi boot environment. Accordingly, there is a desire and need to automatically integrate application programs and their settings between multiple operating systems installed in an OS multi boot environment.

Similar problems arise when a user attempts to coordinate the user interface, settings and preferences of the multiple installed operating systems. Any setting that were changed for OS #1 would have to be manually changed for OS #2 (after a reboot). Likewise, settings that were changed for OS #2 would have to be manually changed for OS #1 (after a reboot). This also takes time and may lead to mistakes particularly for a user unfamiliar with computers. Accordingly, there is a desire and need to automatically integrate the settings and preferences of multiple operating systems installed in an OS multi boot environment.

SUMMARY OF THE INVENTION

The present invention provides an apparatus to automatically integrate application programs and their settings between multiple operating systems installed in an OS multi boot environment.

The present invention also provides an apparatus to automatically integrate the settings and preferences of multiple operating systems installed in an OS multi boot environment.

The above and other features and advantages of the invention are achieved by a computer apparatus for monitoring and integrating changes made to a computer system having a plurality of operating systems installed thereon. The apparatus monitors and records changes in accordance with user preferences for a first operating system. When the computer is booted for use with a second operating system, the apparatus integrates into the second operating system and associated programs the changes made during operation of the computer with the first operating system.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Figure 1:
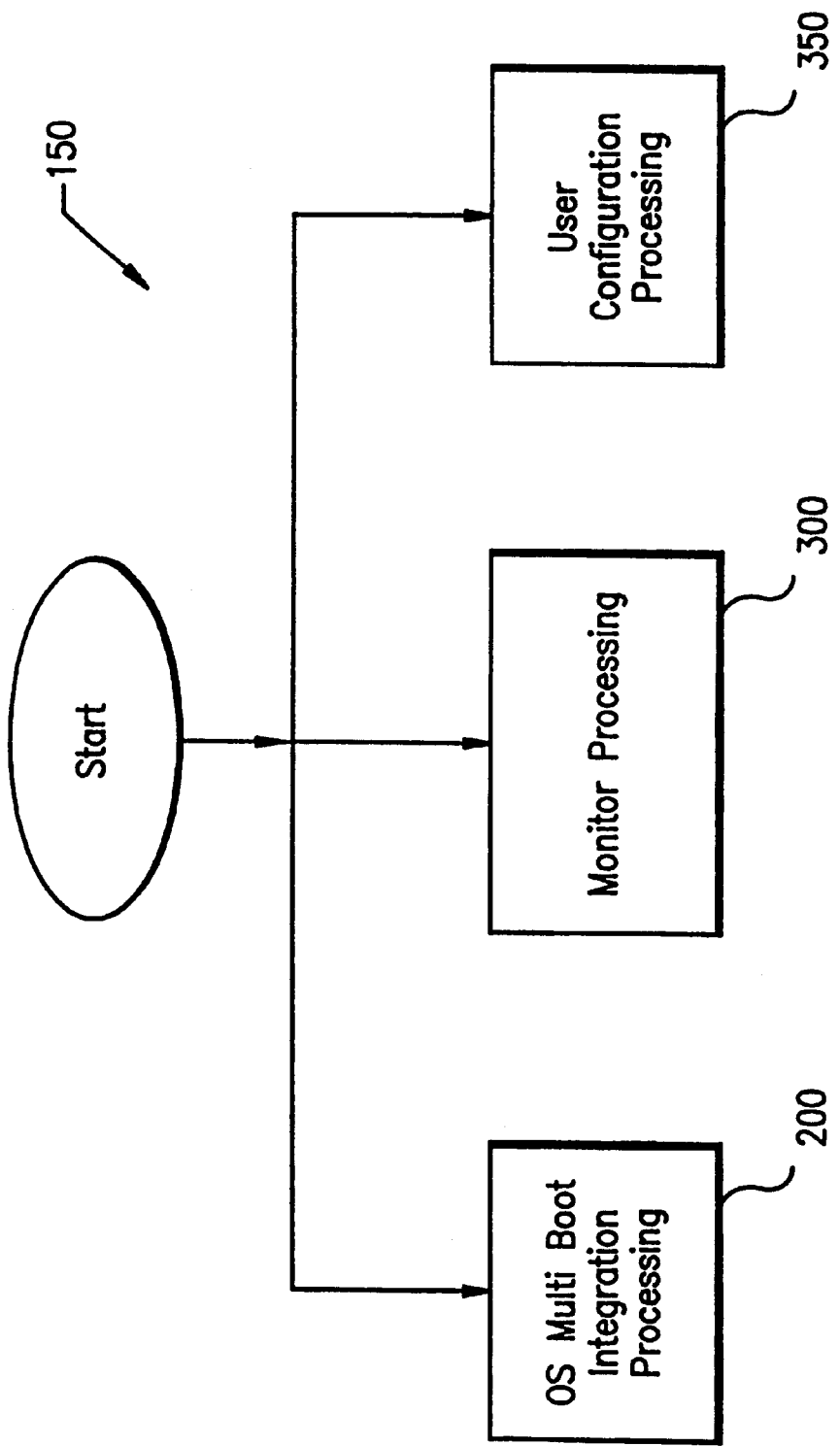
FIG. 1 illustrates the OS multi boot integrator method of one embodiment of the present invention.

FIG. 1 illustrates the OS multi boot integrator method 150 of one embodiment of the present invention. As will be described below, the method 150 is preferably operated on a computer system having an OS multi boot capability, that is, the computer system has more than one operating system installed therein and is capable of booting any of the operating systems upon a power-up or reset condition. In addition, the method 150 may also be operated on a computer having one OS that is connected via a network to a second computer with a different OS.

It is desirable for the method 150 to be initiated as soon as the booted operating system becomes operational and that the method 150 remains running for as long as the system remains on. This may be achieved by any technique available to the OS that has been booted. For example, a computer system booted with WINDOWS 95 could initiate the method 150 from a "startup" group (a startup group contains application programs to be executed every time the OS starts).

The method 150 includes OS multi boot integration processing 200, monitor processing 300 and user configuration processing 350 tasks (described in detail below with reference to FIGS. 3–5). FIG. 1 shows the three tasks 200, 300, 350 being performed in a parallel manner (i.e., all running at the same time), but it must be noted that tasks 200, 300, 250 can be performed sequentially or in any other manner allowable by the booted OS. In addition, it must be noted that the method 150 does not have to be split into the three identifiable tasks 200, 300, 350 illustrated in FIG. 1 and that any number of tasks can be used to perform the present invention.

Figure 2:
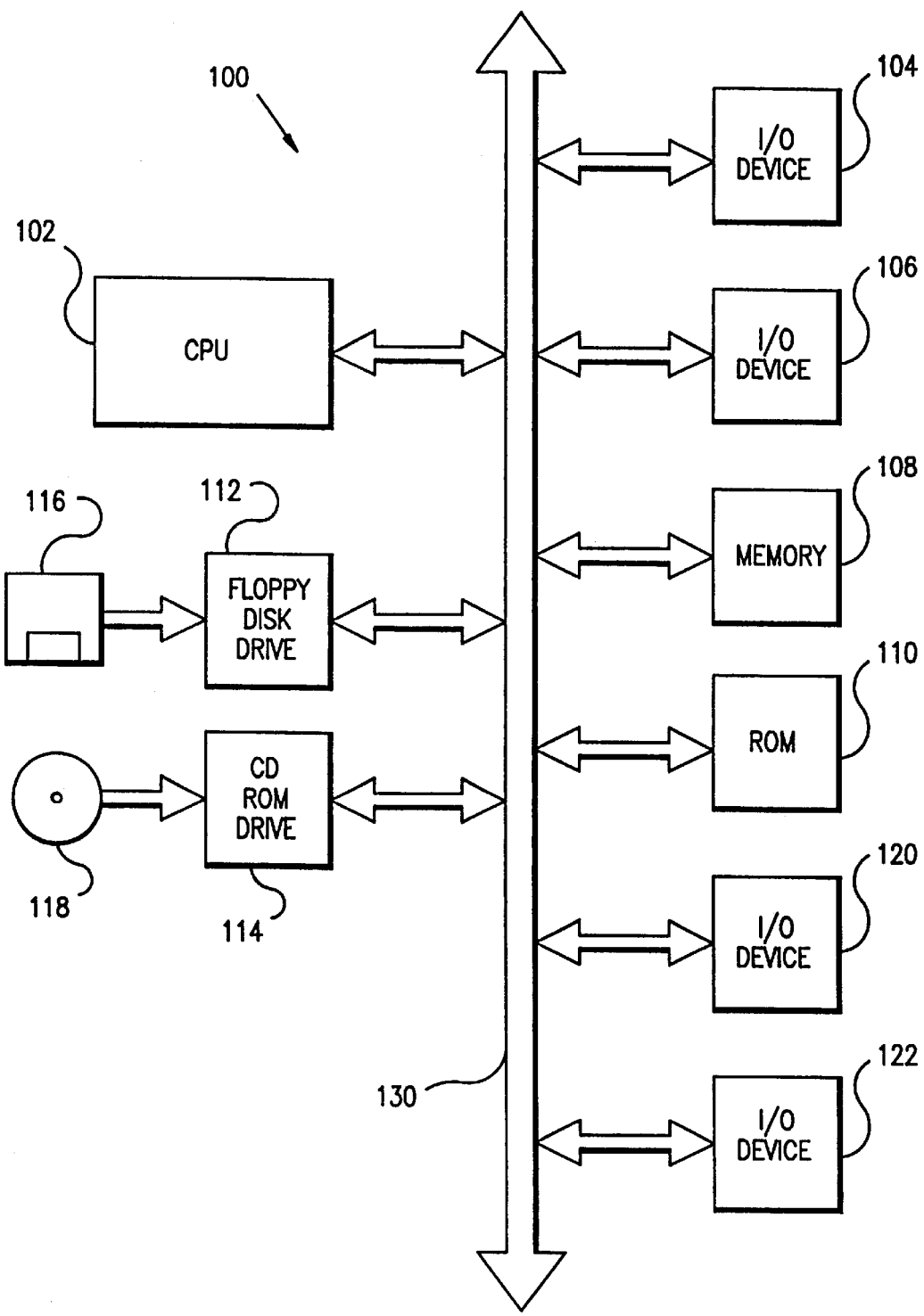
FIG. 2 illustrates an exemplary computer system for implementing the one embodiment of the method of the present invention.

Referring now to FIG. 2, the OS multi boot integrator method 150 of the present invention runs on a programmed general purpose computer system 100. The computer system 100 includes a central processing unit (CPU) 102 that communicates with an input/output (I/O) device 104 over a bus 130. Additional I/O devices 106, 120, 122 are illustrated, but are not necessary. The computer system 100 also memory 108, read only memory (ROM) 110, and may include peripheral devices such as a floppy disk drive 112 and a compact disk (CD) ROM drive 114 which also communicate with the CPU 102 over the bus 130. It must be noted that the exact architecture of the computer system 100 is not important and that any combination of computer compatible devices may be incorporated into the system 100 as long as the OS multi boot integrator method 150 of the present invention can operate on the system 100 as described below with references to FIGS. 3–5. Moreover, the program for CPU 102 which causes it to implement the method 150 of the present invention may be stored in memory 108, ROM 110, CD-ROM 118, floppy disk 116, a hard drive or any other medium capable of storing a program. During execution of the program it will be loaded into the main memory of the CPU (not shown). All of these devices communicate with CPU 102 as is well known in the art.

The CPU 102 performs any logical and mathematical operations required by the method 150 of the present invention, such as data manipulation and comparisons, as well as other arithmetic and logical functions generally understood by those of ordinary skill in the art. The memory 108 is used to store data and program instructions required to implement the method 150 of the present invention and can be comprised of conventional random access memory (RAM), dynamic random access memory (DRAM), bulk storage memory, or any combination thereof, as generally understood by those of ordinary skill in the art. In addition, the memory 108 will contain at least two installed operating systems allowing the computer system 100 to have a multi boot capability. The I/O devices 104, 106, 120, 122 are responsible for interfacing with an operator of the computer system 100 or with peripheral data devices such as a hard drive or other device (not shown) to receive or distribute data as generally understood by those of ordinary skill in the art. Typical I/O devices include a keyboard, mouse, and display.

Any conventional technique can be used to install the multiple operating systems into the memory 108. Currently, there exists numerous commercially available utilities for such purposes. These utilities, such as V Communications' SYSTEM COMMANDER, for example, will also provide the capability to selectively boot one of the operating systems out of the memory 108 and into the main memory of the CPU 102 (not shown). Typically, the utilities provide some form of menu or instruction screen to allow a computer user to choose which OS to boot and if the user does not choose an OS to boot, the utility will boot a "default" OS. It must be noted that the technique used to install or boot the operating systems is not important and the invention should not be limited to any specific technique.

Referring again to FIG. 1, a brief description of the method 150 of the present invention will be provided. A detailed description will follow with references to FIGS. 3–5. To aid in the discussion, "OS #1" will be used to refer to one installed operating system while "OS #2" will be used to refer to a different installed operating system. It must be noted that the method 150 of the present invention will operate regardless of the booted OS.

Briefly, and presuming that OS #1 has been booted, the monitor processing 300 will record changes made to operating system settings files, user applications, data files and any newly installed or uninstalled application programs. Operating system setting files are files used by the OS to manage the hardware, software and user preferences. An example of a typical operating system settings file is a registry file used by WINDOWS NT and WINDOWS 95. When OS #2 is booted, the OS multi boot integration processing 200 will examine and integrate the changes recorded for OS #1. Meanwhile, the monitor processing 200 will record additional changes made to system settings, data files, etc. for OS #2 (so these changes will eventually be integrated into OS #1). The user configuration processing 350 allows the user to determine the level of integration (i.e., the types of changes to be integrated between the multiple operating systems).

The changes made for the monitored OS will be recorded in a "record change" file which is accessible by the method 150 of the present invention regardless of the booted OS. As will be described below with reference to FIG. 4, the record change file will include only the information which the user has selected to be monitored. For example, if the user is only interested in whether new applications have been installed, then the record change file will only include information concerning new installations. It may also be desirable for the record change file to include an operating system identifier (OS ID) to determine which operating system has undergone the change. This will prevent changes made under OS #1 from being deleted if OS #1 is rebooted prior to OS #2 being booted. If there are three or more installed operating systems, for example, the OS ID will be useful to ensure that all of the operating systems are integrated with the recorded changes.

Figure 3:
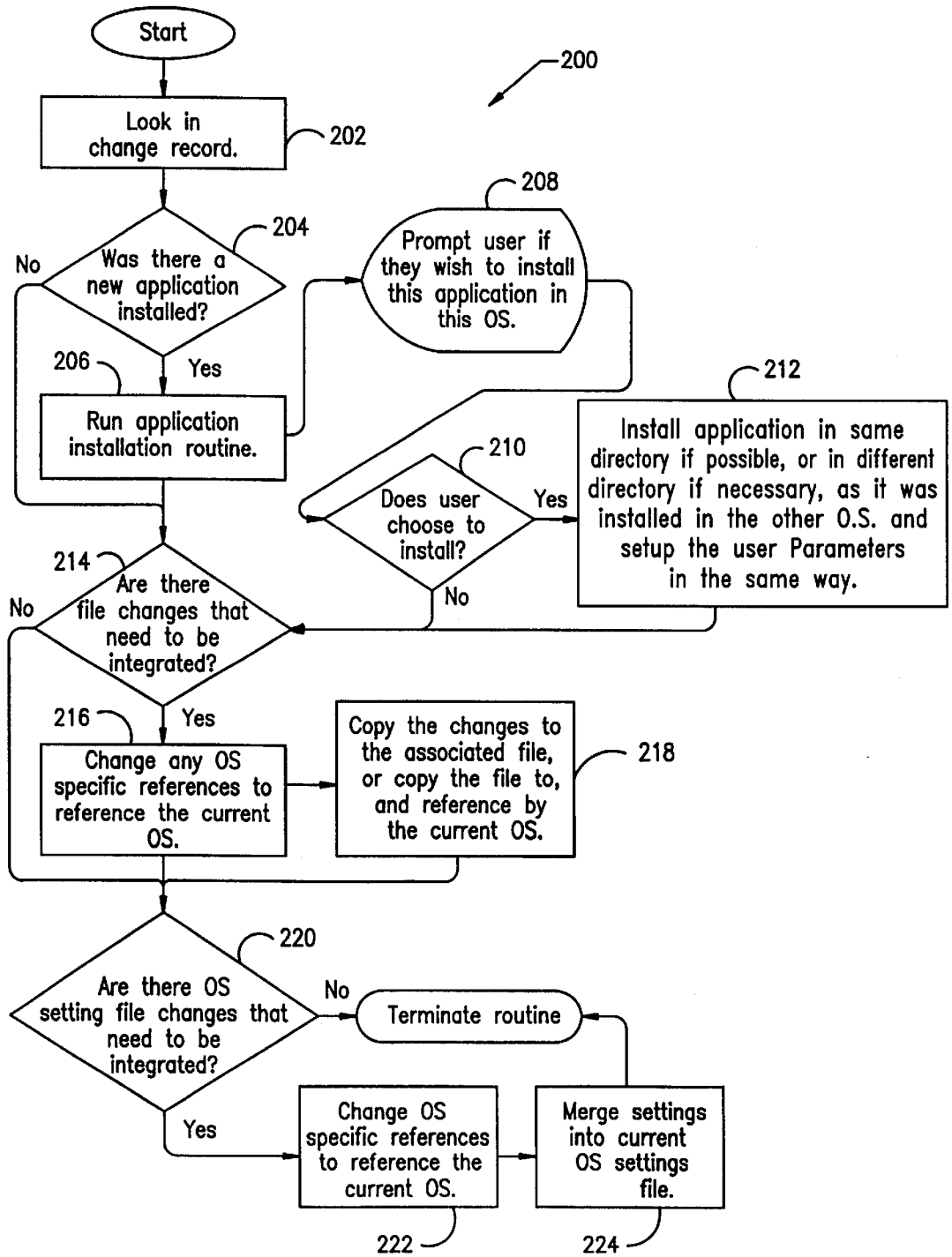
FIG. 3 illustrates in flowchart form an exemplary OS multi boot integration processing performed by a method of the present invention.

FIG. 3 illustrates one example of the OS multi boot integration processing 200 performed by the method 150 of the present invention. Presuming OS #1 is currently booted, the processing 200 will examine the change record file (step 202) to determine what changes were recorded by the present invention for OS #2 (and any other installed OS). Once the change record file has been examined, the processing determines whether a new application program was installed (step 204). If no new application program was installed for OS #2, or if the user has chosen not to have newly installed application programs recorded, the processing continues at step 214. If it has been determined that a new application program was installed for OS #2, an application installation routine is initiated (step 206). The application installation routine will alert the user that a new application program was installed for OS #2 and prompt the user if this application program should be installed for OS #1 (step 208). The application installation routine will coordinate the following steps required to properly install and setup the new application program.

At step 210, it is determined if the user wants to install the new application program. If the user decides not to install the new application program, the processing continues at step 214 to determine if any file changes for OS #2 need to be integrated. If the user wishes to install the new application program, the application program is installed in the same directory as it was installed for OS #2, if the application program allows it, or in a new directory if the application program does not allow a second installation in the same directory (step 212). In addition, any user settings, data files, etc. required by the newly installed application program (for OS #1) will be copied from the settings, data files, etc. saved for OS #2. Thus, the application program will be installed to run on both OS #1 and OS #2 and will also be configured the same. Once the application program has been installed and setup, the processing continues at step 214 to determine if any file changes for OS #2 need to be integrated. It must be noted, that although not shown in FIG. 3, the processing 200 would check the record change file for additional newly installed application programs and loop through steps 204 to 212 to install and integrate them.

At step 214 it is determined if any "data" file changes made for OS #2 need to be integrated for OS #1. Data files can be application program files such as bookmarks for an INTERNET browser. If no data file changes need to be integrated, or if the user has decided not to integrate data file changes, the processing continues at step 220 to determine if any OS settings file changes need to be integrated. If there were data file changes, the processing determines and modifies any OS specific references so that they reference the current OS (216). That is, any data file change pointing to OS #2 or otherwise setup for OS #2 would have to be verified that they could be suitable for use with OS #1 and then modified to reference OS #1. Once the data file changes are modified for OS #1, they are copied into the appropriate OS #1 data file (step 218). In addition, where possible, he data file it self will be copied into the appropriate directory for OS #1. Once the data file changes have been integrated, the processing continues at step 220 to determine if any OS settings file changes need to be integrated. It must be noted, that although not shown in FIG. 3, the processing 200 would check the record change file for additional data file changes and loop through steps 214 to 218 to integrate them.

At step 220, it is determined if any OS settings file changes made for OS #2 need to be integrated for OS #1. If no OS settings file changes need to be integrated, or if the user has decided not to integrate OS settings file changes, the processing 200 completes. If there were OS settings file changes, the processing determines and modifies any OS specific references so that they reference the current OS (step 222). That is, any OS settings file changes pointing to OS #2 or otherwise setup for OS #2 would have to be verified that they could be suitable for use with OS #1 and then modified to reference OS #1. Once the OS settings file changes are modified for OS #1, they are merged into the appropriate OS #1 settings file (step 224). It must be noted, that although not shown in FIG. 3, the processing 200 would check the record change file for additional OS settings file changes and loop through steps 220 to 224 to integrate them. At this point, the OS multi boot integration processing 200 is completed. It must be noted that the processing 200 could be configured to prompt the user every time a change is going to be integrated if so desired.

Figure 4:
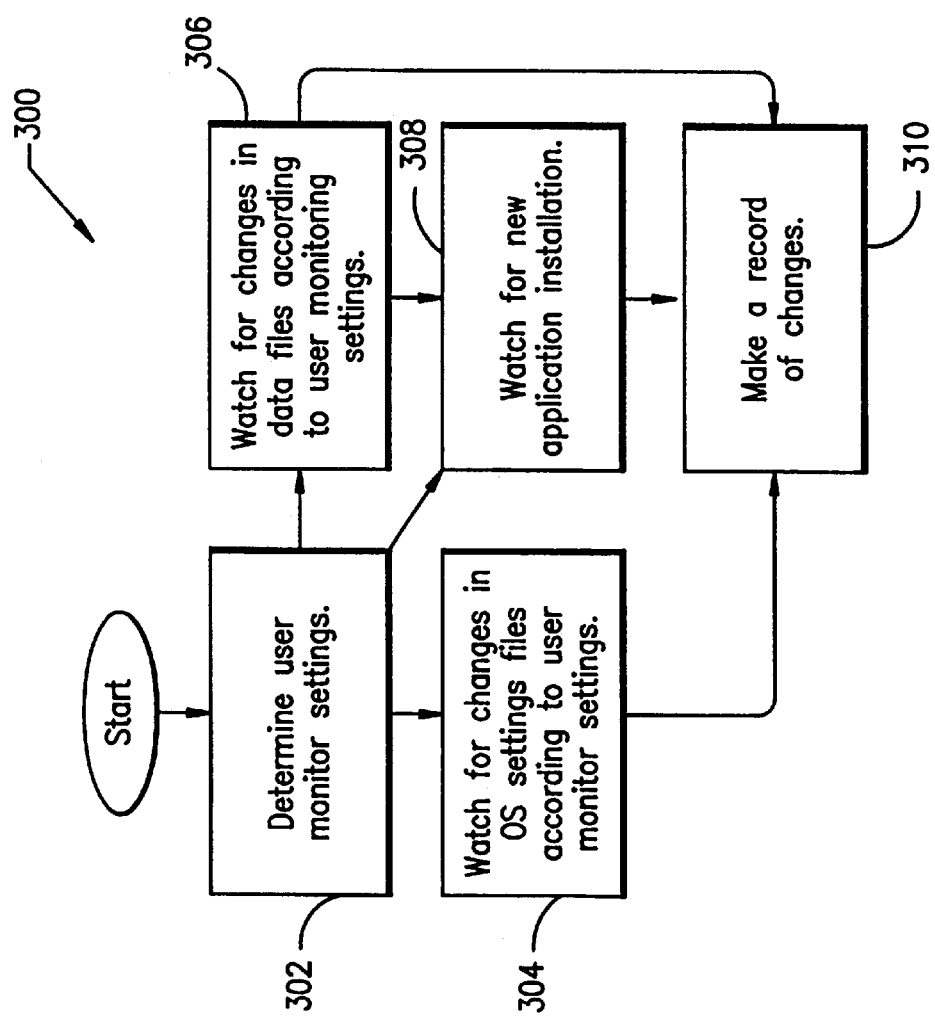
FIG. 4 illustrates an exemplary monitor processing performed by a method of the present invention.

FIG. 4 illustrates one example of the monitor processing 300 performed by the method 150 of the present invention. Presuming OS #1 is currently booted, the processing 300 will continuously monitor and record changes so that they may be integrated into OS #2 (and any other installed OS). At step 302, the monitor processing 300 determines what should be monitored by examining user monitor settings (described below with reference to FIG. 5). As stated earlier, the user decides the level of integration. The user's decision is stored away in a user monitor settings file. Depending upon the user monitor settings, the processing continues to steps 304, 306, 308. The three steps 304, 306, 308 are illustrated as being initiated in a parallel manner (i.e., all running at the same time), but it must be noted that they can be initiated sequentially or in any other manner allowable by the booted OS. In addition, it must be noted that the processing 300 does not have to utilize the three steps 304, 306, 308 as illustrated in FIG. 4 and that any number of steps can be used to properly monitor changes in OS settings files, data files and newly installed application programs.

In step 304, the processing 300 watches for changes in the OS settings files. Changes are determined by examining and storing the current settings for OS #1 upon initiation of the monitor processing 300. In addition, the user monitor settings are examined to determine if any specific OS setting files should or should not be monitored. If an OS settings file that the user wishes to be monitored is changed, these changes are recorded and subsequently placed into the change record file (step 310).

In step 306, the processing 300 watches for changes in the data files. Changes are determined by examining and storing the current settings for OS #1 upon initiation of the monitor processing 300. In addition, the user monitor settings are examined to determine if any specific data files should or should not be monitored. If a data file that the user wishes to be monitored is changed, these changes are recorded and subsequently placed into the change record file (step 310).

In step 306, the processing 300 watches for newly installed application programs. Newly installed application programs are determined by examining and storing the current application programs installed for OS #1 upon initiation of the monitor processing 300. If a new application program is installed, the appropriate information is recorded and subsequently stored into the change record file (step 310). It must be noted that the monitor processing 300 can prompt the user every time a change has been detected. This gives the user a chance to integrate changes that were not previously desired and a chance to not integrate changes that were requested to be monitored.

Figure 5:
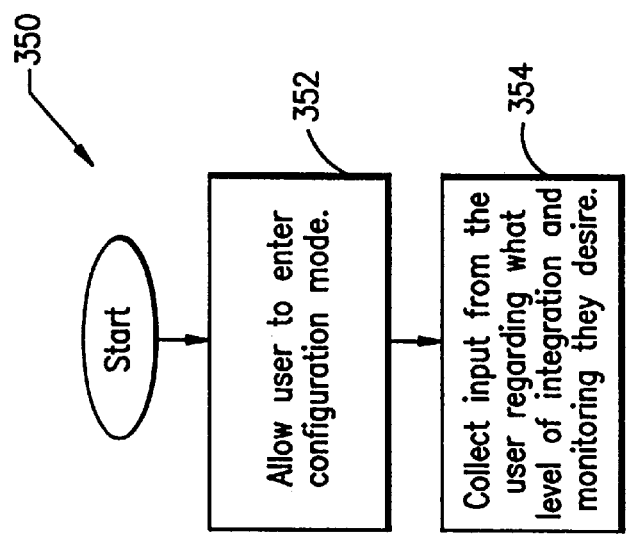
FIG. 5 illustrates an exemplary user configuration processing performed by a method of the present invention.

FIG. 5 illustrates one example of the user configuration processing 350 performed by the method 150 of the present invention. Presuming OS #1 is currently booted, the processing 350 will allow the user to decide the level of integration between OS #1 and the other the installed operating systems. The processing 350 begins by allowing the user to enter a configuration mode (step 352). This can be accomplished by any technique. For example, the processing 350 may be setup to detect a specific character sequence (via keyboard entry) as an indication that the user wishes to enter the configuration mode. In addition, if the OS multi boot integrator method 150 of the present invention utilizes graphical user interface (GUI), a window or menu option can be provided and used to input when the user wishes to enter the configuration mode.

Upon detection that the user wishes to enter the configuration mode (step 352), information regarding the level of integration and monitoring the user desires is input and stored into the user monitor settings file (step 354). As noted earlier, the user decides what information should be integrated and thus, monitored. The user can decide to integrate all changes, some changes or no changes at all. The user can decide, for example, to integrate all changes to OS settings files, while choosing not to integrate newly installed applications.

For example, the user can broadly decide whether to integrate new application program installations, changes in the OS settings files and data files. Once this decision is made, the user can decide whether there are specific OS settings files or data files to monitor and integrate (or not to integrate). In addition, the user configuration processing 350 can be configured to allow the user to control prompts and displayed information. In addition, the processing 350 can utilize a "default" integration level allowing the user to set an integration level that has already been setup. As stated above with reference to FIG. 4, the information stored in the user monitor settings file is used by the monitor processing 300 which monitors and records only the information requested by the user.

It must be noted that the OS multi boot integrator method 150 of the present invention can be utilized on a computer having one OS that is connected via a network to a second computer with a different OS. For example, a user logs onto a networked computer running OS #1 and the method 150 of the present invention. The user installs an application program and then logs off. The installation is recorded by the present invention (as described above with reference to FIG. 4). The user subsequently logs onto a second computer on the same network executing the present invention, but running OS #2. The method 150 detects the newly installed application program and prompts the user if it should be installed (as described above with reference to FIG. 3).

It must be noted that the exact information saved and recorded by the present invention is dependent upon OS and type of applications being installed which may vary. In addition, it must be noted that the present invention can be used to monitor and integrate additional changes to a computer system, such the as deletion or unistallation of program application, and is not to be limited data files, OS settings files and newly installed application programs. It must be noted that the present invention can be setup to confirm selections and responses made by the user if so desired.

It must be noted that the present invention is implemented as a program which gets executed on a computer system. The invention can be written in different computer languages for different computer systems. The present invention can be stored on a hard drive, floppy disc, CD-ROM or other permanent or semi-permanent storage medium. The program embodying the present invention can also be divided into program code segments, downloaded, for example, from a server computer or transmitted as a data signal embodied in a carrier wave as is known in the art.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer readable storage medium containing a computer readable code for operating a computer to perform a method for integrating changes made to a computer system operating under a first operating system into said computer system when operating under a second operating system, said method comprising:

recording at least one change to said computer system made when operating under said first operating system;

checking, while said computer system is operating under said second operating system, for any recorded changes; and applying said at least one recorded change to the computer system while it is operating under said second operating system.

2. The computer readable storage medium of claim 1 wherein said method further comprises the act of prompting a user to select if one or more changes to be applied, and applying only those changes which said user selects to apply.

3. The computer readable storage medium of claim 1 wherein said at least one recorded change comprises at least one change made to data files of said first operating system.

4. The computer readable storage medium of claim 3 wherein said method further comprises:

verifying that said at least one recorded change is suitable for use or modifiable to be suitable for use with said second operating system, wherein if said at least one recorded change is only modifiable it is modified to be suitable for use with said second operating system; and copying said verified or modified at least one change into corresponding data files of said second operating system.

5. The computer readable storage medium of claim 3 wherein said method further comprises:

verifying that the changed data files are suitable for use with said second operating system; and using said verified changed data files as data files of said second operating system.

6. The computer readable storage medium of claim 1 wherein said at least one change comprises at least one change made to operating settings files of said first operating system.

7. The computer readable storage medium of claim 6 wherein said method further comprises:

verifying that said at least one recorded change is suitable for use or modifiable to be suitable for use with said second operating system, wherein if said at least one recorded change is only modifiable it is modified to be suitable for use with said second operating system; and copying said verified or modified at least one change into corresponding operating system setting files of said second operating system.

8. The computer readable storage medium of claim 1 wherein said at least one recorded change comprises new application programs.

9. The computer readable storage medium of claim 8 wherein said method further comprises the act of installing any new application programs previously installed under said first operating system for said second operating system.

10. The computer readable storage medium of claim 9 wherein said method further comprises the act of setting up the installed application programs for said second operating system based on parameters used to setup corresponding application programs of said first operating system, wherein if the parameters are not suitable for use with said second operating system, the parameters are modified to be suitable for use with said second operating system.

11. A computer readable storage medium containing a computer readable code for operating a computer to perform a method of monitoring and integrating the changes made to a computer system operating under a first operating system into said computer system when operating under a second operating system, said method comprising:

inputting, while said computer system is operating under said first operating system, information representing features of said computer system to be monitored;

determining if any of the features corresponding to said input information were changed while said computer system is operating under said first operating system;

storing at least one change on a computer readable medium;

booting said computer system with said second operating system;

inputting said at least one stored change from said computer readable medium; and applying at least one stored change to the computer system while operating under said second operating system.

12. The computer readable storage medium of claim 11 wherein said method further comprises the act of prompting a user to select if one or more changes to be applied, and applying only those changes which said user selects to apply.

13. The computer readable storage medium of claim 11 wherein said at least one stored change comprises changes made to data files of said first operating system.

14. The computer readable storage medium of claim 13 wherein said method further comprises:

verifying that said at least one recorded change is suitable for use or modifiable to be suitable for use with said second operating system, wherein if said at least one recorded change is only modifiable it is modified to be suitable for use with said second operating system; and copying said verified or modified at least one change into corresponding data files of said second operating system.

15. The computer readable storage medium of claim 13 wherein said method further comprises:

verifying that the changed data files are suitable for use with said second operating system; and using said verified changed data files as data files of said second operating system.

16. The computer readable storage medium of claim 11 wherein said at least one stored change comprises changes made to operating system settings files of said first operating system.

17. The computer readable storage medium of claim 16 wherein said method further comprises:

verifying that said at least one recorded change is suitable for use or modifiable to be suitable for use with said second operating system, wherein if at least one recorded change is only modifiable it is modified to be suitable for use with said second operating system; and copying said verified or modified at least one change into corresponding operating system setting files of said second operating system.

18. The computer readable storage medium of claim 11 wherein said at least one stored change comprises new application programs.

19. The computer readable storage medium of claim 18 wherein said method further comprises the act of installing any new application programs previously installed under said first operating system for said second operating system.

20. The computer readable storage medium of claim 19 wherein said method further comprises the act of setting up the installed application programs for said second operating system based on parameters used to setup corresponding application programs of said first operating system, wherein if the parameters are not suitable for use with said second operating system, the parameters are modified to be suitable for use with said second operating system.

21. A programmed computer system comprising:

means for recording at least one change to said computer system made when operating under a first operating system;

means for checking, while said computer system is operating under a second operating system, for any recorded changes; and means for applying said at least one recorded change to the computer system while it is operating under said second operating system.

22. The system of claim 21 further comprising means for prompting a user to select if one or more changes to be applied, and applying only those changes which said user selects to apply.

23. The system of claim 21 wherein said at least one recorded change comprises at least one change made to data files of said first operating system.

24. The system of claim 23 further comprising:

means for verifying that said at least one recorded change is suitable for use with said second operating system; and means for copying said verified at least one change into corresponding data files of said second operating system.

25. The system of claim 23 further comprising:

means for verifying that the changed data files are suitable for use with said second operating system; and means for using said verified changed data files as data files of said second operating system.

26. The system of claim 21 wherein said at least one recorded change to said computer system made when operating under said first operating system is recorded on a computer readable medium.

27. The system of claim 21 wherein said at least one change comprises at least one change made to operating settings files of said first operating system.

28. The system of claim 27 further comprising:

means for verifying that said at least one recorded change is suitable for use with said second operating system; and means for copying said verified at least one change into corresponding operating system setting files of said second operating system.

29. The system of claim 21 wherein said at least one recorded change comprises new application programs.

30. The system of claim 29 further comprising means for installing any new application programs previously installed under said first operating system for said second operating system.

31. The system of claim 30 further comprising means for setting up the installed application programs for said second operating system based on parameters used to setup corresponding application programs of said first operating system, wherein if the parameters are not suitable for use with said second operating system, the parameters are modified to be suitable for use with said second operating system.

32. A programmed computer system comprising:
   means for inputting, while said computer system is operating under a first operating system, information representing features of said computer system to be monitored;
   means for determining if any of the features corresponding to said input information were changed while said computer system is operating under said first operating system;
   means for storing at least one change on a computer readable medium;
   means for booting said computer system with a second operating system;
   means for inputting said at least one stored change from said computer readable medium; and
   means for applying at least one stored change to the computer system while operating under said second operating system.

33. A computer system for integrating system changes while operating under a first operating system into the computer system while operating under a second operating system, said computer system comprising:
   a programmed processor, said programmed processor:
      records at least one change to said computer system made when operating under said first operating system;
      checks, while said computer system is operating under said second operating system, for any recorded changes; and
      applies said at least one recorded change to the computer system while it is operating under said second operating system.

34. A computer system for integrating system changes while operating under a first operating system into the computer system while operating under a second operating system, said computer system comprising:
   a programmed processor, said programmed processor:
      inputs, while said computer system is operating under said first operating system, information representing features of said computer system to be monitored;
      determines if any of the features corresponding to said input information were changed while said computer system is operating under said first operating system;
      stores at least one change on a computer readable medium;
      boots said computer system with said second operating system;
      inputs said at least one stored change from said computer readable medium; and
      applies at least one stored change to the computer system while operating under said second operating system.

35. A computer-readable data signal embodied in a carrier wave, said computer data signal for integrating system changes while operating under a first operating system into a computer system while operating under a second operating system, said computer data signal comprising:
   a first program code segment for recording at least one change to said computer system made when operating under said first operating system;
   a second program code segment for checking, while said computer system is operating under said second operating system, for any recorded changes; and
   a third program code segment for applying said at least one recorded change to the computer system while it is operating under said second operating system.

36. A computer-readable data signal embodied in a carrier wave, said computer data signal for integrating system changes while operating under a first operating system into a computer system while operating under a second operating system, said computer data signal comprising:
   a first program code segment for inputting, while said computer system is operating under said first operating system, information representing features of said computer system to be monitored;
   a second program code segment for determining if any of the features corresponding to said input information were changed while said computer system is operating under said first operating system;
   a third program code segment for storing at least one change on a computer readable medium;
   a fourth program code segment for inputting said at least one stored change from said computer readable medium while said computer system is operating under said second operating system; and
   a fifth program code segment for applying at least one stored change to the computer system while operating under said second operating system.

37. A computer-readable program transmitted from a server computer, said computer program for integrating system changes while operating under a first operating system into a computer system while operating under a second operating system, said computer program comprising:
   a first program code segment for recording at least one change to said computer system made when operating under said first operating system;
   a second program code segment for checking, while said computer system is operating under said second operating system, for any recorded changes; and
   a third program code segment for applying said at least one recorded change to the computer system while it is operating under said second operating system.

38. A computer-readable program transmitted from a server computer, said computer program for integrating system changes while operating under a first operating system into a computer system while operating under a second operating system, said computer program comprising:
   a first program code segment for inputting, while said computer system is operating under said first operating system, information representing features of said computer system to be monitored;
   a second program code segment for determining if any of the features corresponding to said input information were changed while said computer system is operating under said first operating system;
   a third program code segment for storing at least one change on a computer readable medium;
   a fourth program code segment for inputting said at least one stored change from said computer readable medium while said computer system is operating under said second operating system; and a fifth program code segment for applying at least one stored change to the computer system while operating under said second operating system.

39. A computer-readable storage medium containing a computer-readable code for operating a computer to perform a method for integrating changes made to a computer system operating under a first operating system into the computer system when operating under a second operating system, the method comprising:

recording at least one change to the computer system made when operating under the first operating system;

checking, while the computer system is operating under the second operating system, for the at least one recorded change;

applying the at least one recorded change to the computer system while it is operating under the second operating system; and repeating the checking and applying operations as often as necessary to record any additional changes to the computer system made when operating under the first operating system.

\* \* \* \* \*